(12) United States Patent
Ichkhan et al.

(10) Patent No.: US 8,467,426 B2
(45) Date of Patent: Jun. 18, 2013

(54) METHOD AND APPARATUS FOR COOLING A FIBER LASER OR AMPLIFIER

(75) Inventors: Joseph Ichkhan, Redondo Beach, CA (US); John Schroeder, Long Beach, CA (US); David A. Rockwell, Culver City, CA (US)

(73) Assignee: Raytheon Company, Waltham, MA (US)

( * ) Notice: Subject to any disclaimer, the term of this patent is extended or adjusted under 35 U.S.C. 154(b) by 315 days.

(21) Appl. No.: 12/900,141

(22) Filed: Oct. 7, 2010

(65) Prior Publication Data

US 2012/0085518 A1   Apr. 12, 2012

(51) Int. Cl.
*H01S 3/04* (2006.01)
(52) U.S. Cl.
USPC ........ 372/36; 372/6; 372/33; 372/34; 372/35; 372/39; 385/135
(58) Field of Classification Search
USPC .............................................. 372/6
See application file for complete search history.

(56) References Cited

U.S. PATENT DOCUMENTS

| 5,275,232 | A | 1/1994 | Adkins et al. |
| 7,013,956 | B2 | 3/2006 | Thayer et al. |
| 7,400,812 | B2 | 7/2008 | Seifert |
| 7,457,502 | B2 | 11/2008 | Davis |
| 2010/0247055 | A1* | 9/2010 | Arashitani et al. ............ 385/137 |

OTHER PUBLICATIONS

Koechner, W., "Solid-State Laser Eng'g," Springer, New York, p. 441-447 (1999).

* cited by examiner

*Primary Examiner* — Jessica Stultz
*Assistant Examiner* — Brian Riely

(57) ABSTRACT

A system and method for cooling an optical fiber includes a flexible heat sink member, a heat pipe evaporator, and a thermal storage medium. The flexible heat sink member is in thermal contact with the optical fiber. The heat pipe evaporator is configured to dissipate heat from the optical fiber. The thermal storage medium is in thermal contact with the flexible heat sink member and the heat pipe evaporator. The flexible heat sink member is configured to compensate for any mismatch in coefficient of thermal expansion between material of the optical fiber and material of the flexible heat sink member so as to provide radial compliance and to maintain direct thermal contact between the optical fiber and the flexible heat sink member.

24 Claims, 4 Drawing Sheets

METHOD AND APPARATUS FOR COOLING A FIBER LASER OR AMPLIFIER

BACKGROUND

The present disclosure relates to a system and a method for cooling an optical fiber, such as a fiber laser and/or amplifier.

Gain media based on optical fibers (e.g., fiber lasers and amplifiers) provide a broad range of performance features, including high efficiency, robust single-mode output, high reliability, compact coiled packaging, large surface-area-to-volume ratio for favorable thermal performance, and an all-fiber architecture without any free-space optics and hence no requirement for a rigid optical bench.

Over the past decade, output powers of fiber lasers have been increased several orders of magnitude, from watt-level to 10 kW. When a system incorporating these high-power fiber lasers is built, then a means for cooling such high-power fiber lasers is needed.

Thermal management of solid-state lasers is quite mature, and the basic cooling approaches are known. However, many conventional cooling approaches include moving parts, flowing liquids, etc., and are therefore not desirable for use in space-based applications.

Further, conventional cooling approaches that are used for relatively short, wide solid-state lasers may be very different from cooling approaches that are suitable for long, thin fiber medium (e.g., fiber lasers and amplifiers). For example, in fiber laser cooling, the long length of the fiber makes it difficult to maintain intimate thermal contact between a heat sink and the fiber over wide temperature ranges, mainly due to differences in thermal expansion of the glass fiber and the metal heat sink. Therefore, it is desirable to have a cooling approach for fiber lasers in which good thermal contact is maintained between the fiber laser and a heat sink which conducts heat away from the laser medium to a heat exchanger, or a radiator (e.g., in space-based applications). Also, it is desirable to have a cooling approach for the fiber lasers (e.g., used in space-based applications) in which the heat from the fiber laser is efficiently dissipated to the heat exchanger, or radiator (e.g., in space-based applications) without the use of moving parts, flowing liquids, etc.

Thermal management of high-power fiber lasers is not very mature, because kW-class fiber lasers (which require the most aggressive cooling) have only been available for the past few years. Commercial fiber lasers producing powers below about 50 W are typically formed into a coil and then cooled by ambient air. For higher powers of several hundred watts, and perhaps up to the kW level, the coils are water-cooled. For example, kW-class fiber lasers may be cooled simply by immersing the coiled fiber in a water bath.

One conventional approach uses phase change materials (PCMs) for cooling fiber lasers in which small capsules of PCM are suspended in a liquid coolant, which is in direct thermal communication with the fiber. The small capsules of PCM are suspended in the liquid coolant to increase the heat capacity of the liquid. Then the liquid coolant is allowed to flow longitudinally along the length of the fiber. However, the PCM capsules may not flow at the same rate as the liquid, and in fact the PCM capsules may actually be static; in these cases the PCM capsules do not provide the anticipated thermal management benefit. Heat is removed from the PCM capsules by the coolant liquid. This cooling approach uses flowing liquids and moving parts that are not optimal for space-based applications.

Another conventional approach for cooling of fiber lasers uses a cooling approach in which the fibers are wrapped about a cylindrical heat sink. This cooling approach does not use phase change materials. One design strategy is to avoid placing the fiber under tension, due to concerns that sustained tension will affect the optical properties of the fiber or promote early failure of the fiber. For this reason, winding the fiber on the outside of the metal cooling ring is avoided, since the winding will have to be done with a certain amount of tension in the fiber to overcome the natural tendency of a fiber coil to spring out away from the coil axis. This tendency would likely reduce the fiber thermal contact with the heat sink. To overcome this problem, the fiber may be wound around the inside of a cooling ring. A spiral groove may be cut into the internal surface of the cooling ring, and the fiber is wound into the groove and thermally contacted to the ring by means of grease, liquid, or a gel. This accommodates a difference in thermal expansion between the fiber material and the cooling ring by making the inner grooves deep enough and filling them with a compliant thermal-contact medium, such that any significant coefficient of thermal expansion (CTE) mismatch can be accommodated by allowing the fiber to move radially in the grooves. This conventional cooling approach is not optimal for space applications, due to the requirement for grease, liquid, or gel to provide thermal contact.

The present disclosure provides improvements over the prior art methods and systems for cooling optical fibers.

SUMMARY

One embodiment relates to a system for cooling an optical fiber. The system includes a flexible heat sink member, a heat pipe evaporator, and a thermal storage medium. The flexible heat sink member is in thermal contact with the optical fiber. The heat pipe evaporator is configured to dissipate heat from the optical fiber. The thermal storage medium is in thermal contact with the flexible heat sink member and the heat pipe evaporator. The flexible heat sink member is constructed and arranged to compensate for any mismatch in coefficient of thermal expansion between material of the optical fiber and material of the flexible heat sink member so as to provide radial compliance and to maintain direct thermal contact between the optical fiber and the flexible heat sink member.

Another embodiment relates to a method for cooling an optical fiber. The method includes providing a flexible heat sink member in thermal contact with the optical fiber; providing a thermal storage medium in thermal contact with the heat sink member and a heat pipe evaporator; compensating, using the flexible heat sink member, for any mismatch in a coefficient of thermal expansion between the optical fiber and the heat sink member so as to provide radial compliance and to maintain direct thermal contact between the optical fiber and the flexible heat sink member; and dissipating heat from the optical fiber using the heat pipe evaporator.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the present disclosure, the structural components illustrated herein can be considered drawn to scale. It is to be expressly understood, however, that many other configurations are possible and that the drawings are for the purpose of example, illustration and description only and are not intended as a definition or to limit the scope of the present disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1:
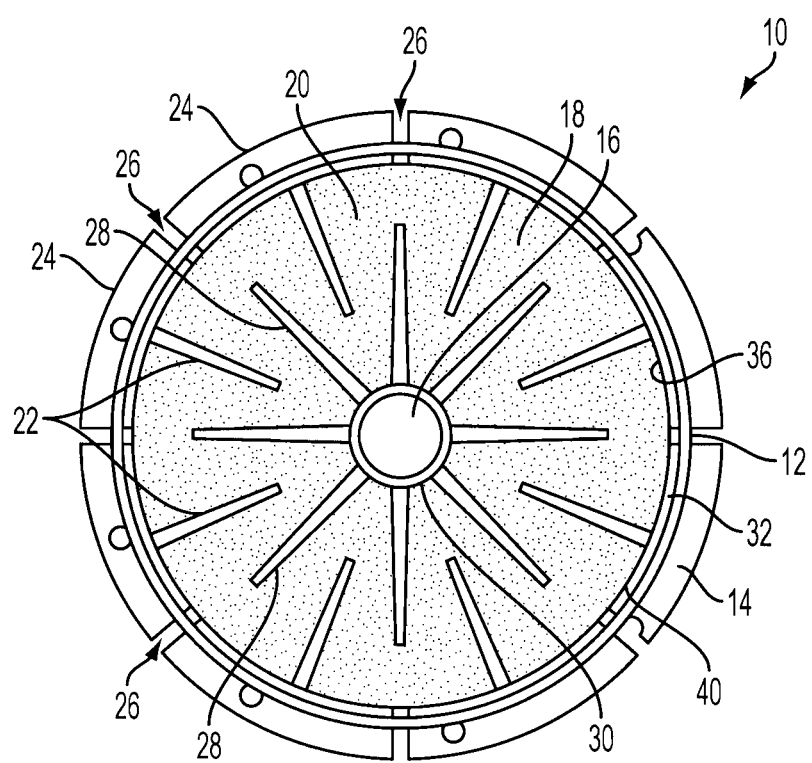
FIG. 1 shows a system for cooling an optical fiber in accordance with an embodiment of the present disclosure.

System 10 for cooling optical fiber 12 in accordance with an embodiment of the present disclosure is shown in FIGS. 1-5. System 10 includes flexible heat sink member 14, heat pipe evaporator 16, and thermal storage medium 18. Flexible heat sink member 14 is in thermal contact with optical fiber 12. Flexible heat sink member 14 is selected to compensate for any mismatch in a coefficient of thermal expansion (CTE) between material of optical fiber 12 and material of flexible heat sink member 14 so as to provide radial compliance, and to maintain direct thermal contact between optical fiber 12 and flexible heat sink member 14. Heat pipe evaporator 16 is configured to dissipate heat from optical fiber 12. Thermal storage medium 18 is in thermal contact with flexible heat sink member 14 and heat pipe evaporator 16.

Thermal storage medium (e.g., phase change materials (PCMs)) based thermal management system 10 provides some important design features that allow the system to accommodate or compensate for any mismatch in coefficient of thermal expansion (CTE) between material of optical fiber (e.g., fused silica) 12 and material of flexible heat sink member 14.

For example, if flexible heat sink member 14 is made from a copper material, the coefficient of thermal expansion of the flexible copper heat sink member is $1.7 \times 10^{-5}/^\circ C.$, while the coefficient of thermal expansion of the optical fiber that is made from, for example, a fused silica material is much smaller than the CTE of copper heat sink member and is at $5.5 \times 10^{-7}/^\circ C.$ In such a case, a mismatch in the coefficient of thermal expansion (CTE) between the fused silica optical fiber and the flexible copper heat sink member is approximately on the order of 30.

The present disclosure provides three different exemplary coefficient of thermal expansion (CTE) compensated configurations for cooling optical fiber 12. These three exemplary CTE-compensated configurations are shown in FIGS. 1-5. Each configuration features the thermal storage medium with heat storage capability, and radial compliance to accommodate the CTE mismatch.

The first exemplary CTE-compensated configuration for cooling the optical fiber is shown in FIG. 1. In the first exemplary CTE-compensated configuration, flexible heat sink member 14 includes segments 24 that are separated from each other by gap 26. Gap 26 is selected to provide radial or mechanical compliance (to accommodate the CTE mismatch between the material of optical fiber 12 and the material of flexible heat sink member 14) and to maintain direct thermal contact between optical fiber 12 and flexible heat sink member 14. Therefore, in the first configuration, the high radial compliance of flexible heat sink member 14 is provided by gaps 26 disposed between (plurality of) segments 24. Gaps 26 prevent distortion of flexible heat sink member 14 upon thermal expansion of flexible heat sink member 14. Further, as will be clear from the discussions below, the heat from optical fiber 12 coiled or wrapped around flexible heat sink member 14 is carried to heat pipe evaporator 16 by thermal storage medium 18. The first exemplary CTE-compensated configuration is explained below in detail with respect to FIG. 1.

Figure 2:
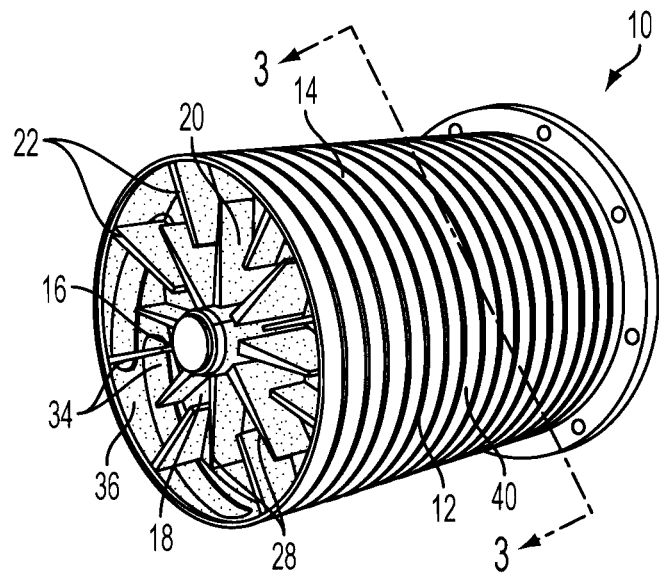
FIG. 2 shows a system for cooling the optical fiber in accordance with another embodiment of the present disclosure.
Figure 3:
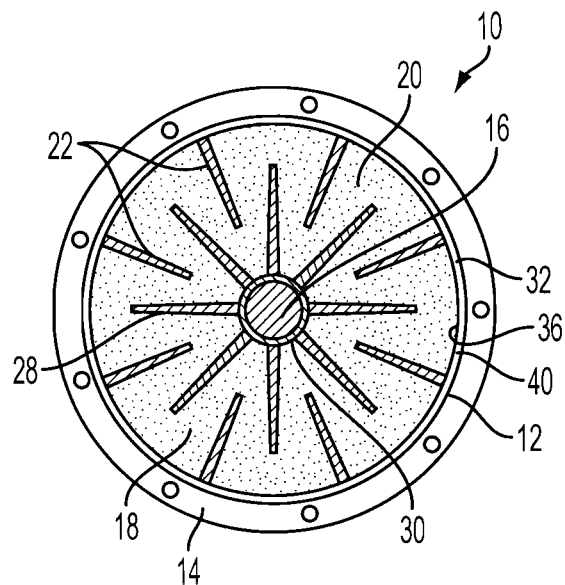
FIG. 3 is a cross-sectional view taken through the line 3-3 in FIG. 2.

The second exemplary CTE-compensated configuration for cooling the optical fiber is shown in FIGS. 2 and 3. In the second exemplary CTE-compensated configuration, flexible heat sink member 14 includes flexural cutouts 34 disposed on internal surface 36 thereof. Flexural cutouts 34 provide radial and torsional compliance for accommodating CTE mismatch over the operational temperature range of system 10. Also, the thickness of the walls of flexible heat sink member 14 is kept thin so as to provide flexural compliance while maintaining strength for expansion of thermal storage medium 18. Therefore, in the second exemplary CTE-compensated configuration, the high radial compliance of flexible heat sink member 14 is provided by flexural cutouts in combination with the thin walls of flexible heat sink member 14. The flexural cutouts 34 and the thin walls of flexible heat sink member 14 prevent distortion of flexible heat sink member 14 upon thermal expansion of flexible heat sink member 14. Further, as will be clear from the discussions below, the heat from optical fiber 12 coiled or wrapped about flexible heat sink member 14 is carried to heat pipe evaporator 16 by thermal storage medium 18. The second exemplary CTE-compensated configuration is explained below in detail with respect to FIGS. 2 and 3.

Figure 4:
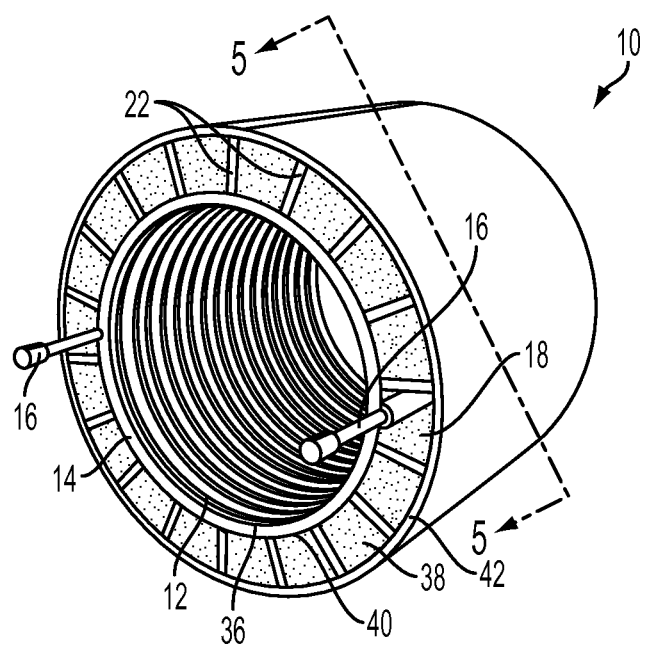
FIG. 4 shows a system for cooling the optical fiber in accordance with yet another embodiment of the present disclosure.
Figure 5:
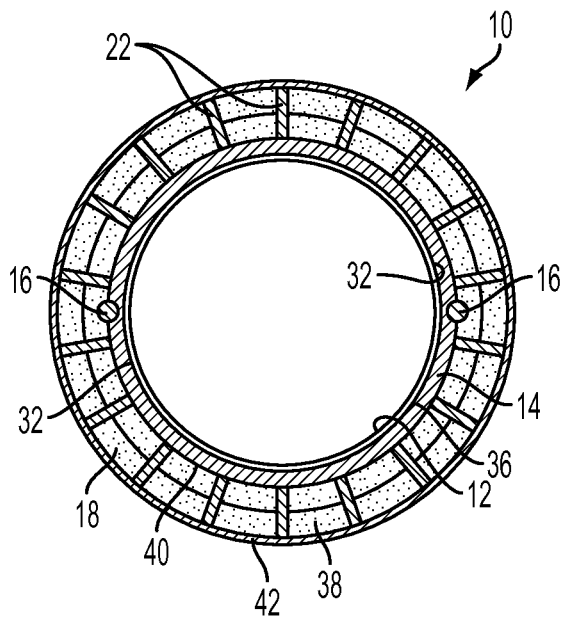
FIG. 5 is a cross-sectional view taken through the line 5-5 in FIG. 4.

The third exemplary CTE-compensated configuration is shown in FIGS. 4 and 5. This third exemplary CTE-compensated configuration provides an "inside-out" passive thermal management approach in which thermal storage medium 18 is disposed outside (rather than inside) of flexible heat sink member 14. In other words, as will be clear from the discussions below with respect to FIGS. 4 and 5, thermal storage medium 18 is configured to fill at least a portion of volume 38 disposed between external surface 40 of flexible heat sink member 14 and outer casing 42. In the third exemplary CTE-compensated configuration, flexible heat sink member 14 may include a plurality of segments that are separated from each other by a gap. The gap is selected to provide radial or mechanical compliance (to accommodate the CTE mismatch between the material of optical fiber 12 and the material of flexible heat sink member 14) and to maintain direct thermal contact between optical fiber 12 and flexible heat sink member 14.

Alternatively or additionally, flexible heat sink member 14, in the third exemplary CTE-compensated configuration as shown in FIGS. 4 and 5, may include a plurality of flexural cutouts disposed on external surface 40 thereof. These flexural cutouts provide radial and torsional compliance for CTE accommodation over the operational temperature range of system 10. Also, the thickness of the walls of flexible heat sink member 14 are kept thin so as to provide flexural compliance while maintaining strength for expansion of thermal storage medium 18. Further, as will be clear from the discussions below, the heat from optical fiber 12 coiled or wrapped about flexible heat sink member 14 is carried to heat pipe evaporator 16 by thermal storage medium 18. The third exemplary CTE-compensated configuration is explained below in detail with respect to FIGS. 4 and 5.

In one embodiment, optical fiber 12 is a fiber amplifier. In another embodiment, optical fiber 12 is a fiber laser. In yet another embodiment, optical fiber 12 is a semi-guiding high-aspect ratio core (SHARC) fiber that is scalable to high power levels. Such a SHARC fiber architecture is disclosed in co-pending U.S. patent application Ser. No. 11/891,328, filed on Aug. 9, 2007 and entitled "Method and Apparatus for Generation and Amplification of Light in a Semi-Guiding High Aspect Ratio Core Fiber," which is incorporated herein by reference in its entirety. In one embodiment, the length of optical fiber 12 may range from less than 1 meter to about 100 m or more.

Optical fiber 12 is coiled or wrapped around internal surface 36 of flexible heat sink member 14 (as shown in FIGS. 4 and 5) or external surface 40 of flexible heat sink member 14 (as shown in FIGS. 1, 2 and 3).

Heat sink member 14 is constructed and arranged to be flexible (i.e., to flex easily in a radial direction). That is, heat sink member 14 is configured to provide high radial compliance, when flexible heat sink member 14 expands thermally due to the heat load from optical fiber 12. In other words, when the heat load from optical fiber 12 is transferred to heat sink member 14, the flexible construction of heat sink member 14 prevents distortion of heat sink member 14 (i.e., upon thermal expansion of flexible heat sink member 14) by providing high radial compliance. Therefore, the flexible construction of heat sink member 14 (that provides radial compliance) maintains an intimate thermal contact between heat sink member 14 and lengthy optical fiber 12 (i.e., coiled or wrapped about heat sink member 14) over wide temperature ranges in system 10.

In one embodiment, flexible heat sink member 14 has a cylindrical shaped cross-sectional configuration. In another embodiment, flexible heat sink member 14 has an elliptically shaped cross-sectional configuration. For example, where the fiber coil experiences alternating stretches of straight and curved surfaces, flexible heat sink member 14 may have an oval shaped cross-sectional configuration. Although the illustrated flexible heat sink member 14 in FIGS. 1-5 includes a cylindrical shaped cross-sectional configuration, it is contemplated that the flexible heat sink member having other shaped configurations that are configured to provide flexural compliance (while maintaining strength for expansion of the thermal storage medium) may be used.

In one embodiment, flexible heat sink member 14 is made from a metal material. In another embodiment, flexible heat sink member 14 is made from a metal matrix composite material. When flexible heat sink member 14 is fabricated from a metal matrix composite material, flexible heat sink member 14 is configured to satisfy the requirements for mechanical rigidity, thermal conduction, and coefficient of thermal expansion.

Flexible heat sink member 14 includes fins 22 that extend from the heat transfer surface area of heat sink member 14. Fins 22 are configured to ensure effective thermal conduction from the heat transfer surface area of heat sink member 14 to the interior of thermal storage medium 18. In other words, fins 22 are configured to increase heat transfer between the heat transfer surface area of flexible heat sink member 14 and thermal storage medium 18. Fins 22 are configured to extend radially from the heat transfer surface area of flexible heat sink member 14.

In one embodiment, as shown in FIGS. 1, 2, and 3, fins 22 are configured to extend radially inward from the heat transfer surface area (of surface 36) of flexible heat sink member 14. In another embodiment, as shown in FIGS. 4 and 5, fins 22 are configured to extend radially outward from the heat transfer surface area (of surface 40) of flexible heat sink member 14.

Fins 22 are integrally formed on the heat transfer surface area of flexible heat sink member 14. In one embodiment, fins 22 have a cylindrically shaped configuration. Fins of other shaped configurations may be used as long as the fins ensure effective thermal conduction from the heat transfer surface area of heat sink member 14 to thermal storage medium 18. Integrally formed, highly conductive fins 22 extend from flexible heat sink member 14 to increase the heat transfer surface area at an interface between flexible heat sink member 14 and thermal storage medium 18, and thereby to enhance the heat transfer into thermal storage medium 18 and to optimize the formation of the melt front. Fins 22 increase the total surface area exposed to the thermal load and, therefore, increase the total amount of heat that can be deposited in thermal storage medium 18. The density, placement and length of fins 22 on flexible heat sink member 14 vary depending on the lasing time, the time required for solidification, and the energy storage requirement.

The direct thermal contact between flexible heat sink member 14 and optical fiber 12 is also achieved using thermal bond material 32 (in cooperation with the flexible heat sink member 14). As discussed above, the flexible construction of heat sink member 14 provides radial compliance required to maintain an intimate thermal contact between heat sink member 14 and lengthy optical fiber 12 over wide temperature ranges of system 10. Also, a low resistance thermal contact between optical fiber 12 and flexible heat sink member 14 is made through thermal bond material 32.

In one embodiment, thermal bond material 32 is a room-temperature vulcanizing (RTV) material or an epoxy material. In such embodiment, thermal bond material 32 is loaded with a silver material or some other material that improves the thermal conductivity of thermal bond material 32. That is, a silver material is dispersed into the thermal bond material 32 to improve the thermal conductivity of thermal bond material 32.

In one embodiment, thermal storage medium 18 is configured to melt when exposed to the heat load arriving from optical fiber 12. In one embodiment, thermal storage medium 18 includes a phase change material (PCM). In general, the PCMs have poor thermal conductivity. In one embodiment, the desired operating temperature, duty cycle, and required volume of system 10 determine the type of the thermal storage material (e.g., paraffin, salt hydrate, etc.) used.

In one embodiment, thermal storage medium 18 includes a paraffin medium. In another embodiment, thermal storage medium 18 includes a salt hydrate medium. Thermal storage medium 18 may be selected from the group consisting of lithium nitrate trihydrate, sodium thiosulfate, cerrolo fusible alloy-158, acetamide, n-hexatriac ontane, n-triac ontane, eicosane, and thermasorb 95.

Table I below provides various pertinent properties (e.g., type, melting point, latent heat, cost per pound, cost per panel, and added panel weight) for some exemplary thermal storage media (phase change materials).

TABLE I

| Phase Change Material | Type | Melting Point (°C.) | Latent Heat (W-s/in³) | Cost/ Pound ($) | Cost/ Panel ($) | Added Panel Weight (pounds or lbs) |
|---|---|---|---|---|---|---|
| Lithium nitrate trihydrate | Salt Hydrate | 29.9 | 11126 | 105 | 307 | 2.94 |
| Sodium Thiosulfate | Salt Hydrate | 48.3 | 5677 | 36 | 120 | 3.32 |
| Cerrolo Fusible Alloy - 158 | Metal Eutectic | 70.1 | 4998 | 11 | 196 | 17.8 |
| Acetamide | Non-Organic | 81.1 | 4584 | 102 | 224 | 2.2 |
| n-hexatraic ontane $C_{35}H_{74}$ | Paraffin | 75 | 3447 | 447 | 676 | 1.51 |
| n-triac ontane $C_{30}H_{62}$ | Paraffin | 65.8 | 3173 | 5210 | 7658 | 1.47 |
| n-Eicosone $C_{20}H_{42}$ | Paraffin | 36.7 | 3144 | 141 | 207 | 1.47 |
| Thermasorb 95 | Microencap | 35 | 2237 | 25 | 38 | 1.53 |

In one embodiment, as shown in FIGS. 1, 2 and 3, thermal storage medium 18 is configured to fill at least a portion of volume 20 defined by at least heat sink member 14. In another embodiment, as shown in FIGS. 4 and 5, thermal storage medium 18 is configured to fill at least a portion of external volume 38 disposed between external surface 40 of heat sink member 12 and outer casing 42.

In general, heat pipe evaporator 16 includes a closed or a sealed housing that defines a chamber therein. The chamber contains a capillary structure and a working fluid. The working fluid is selected to have both a liquid phase and a vapor phase within a desired range of operating temperatures. When one portion of the chamber is exposed to relatively high temperature (from thermal storage medium 18), the heat pipe is configured to function as an evaporator section. The working fluid in the chamber is vaporized in the evaporator section causing an increase in pressure forcing the vapor thus formed to a condenser section (i.e., a relatively lower temperature section of the chamber). The vapor is condensed in the condenser section and returns through the capillary structure to the evaporator section by capillary action of the capillary structure. Therefore, the heat pipe operates on the principle of phase changes (i.e., an evaporation-condensation cycle with the help of porous capillaries) to transfer heat at a much higher rate than conventional heat transfer systems.

U.S. Pat. Nos. 7,013,956 and 5,275,232, the entirety of which is hereby incorporated by reference, disclose exemplary heat pipe evaporators. Such heat pipe evaporators are known in the art and therefore the operation of such heat pipe evaporators is not described in detail herein.

The cross-section of the first exemplary CTE-compensated configuration is shown in FIG. 1. As noted above, flexible heat sink member 14 includes segments 24. That is, rather than a fully continuous surface, the outer surface of flexible heat sink member 14 includes plurality of individual segments 24 that extend along the length of heat sink member 14 (i.e., perpendicular to the plane of FIG. 1). The width of individual segment 24 in contact with one turn of the coiled optical fiber is selected to be able to maintain direct thermal contact between the optical fiber and the flexible heat sink member over the required range of operating temperatures in the optical fiber.

Segments 24 are separated from each other by gap 26. Gap 26 is selected to provide radial or mechanical compliance (to accommodate the CTE mismatch between the material of optical fiber 12 and the material of flexible heat sink member 14) and to maintain direct thermal contact between optical fiber 12 and flexible heat sink member 14. Thermal bond material 32 thermally connects optical fiber 12 to segments 24 along the width of segment 24. The width of segment 24 along the circumference of heat sink member 14 is established by the limit of thermal bond material 32 to accommodate the CTE mismatch. For a given bond-material strength of thermal bond material 32, the length of segment 24 may be greater for lower CTE mismatches, and the length of segment 24 may be lesser for higher CTE mismatches.

As shown in FIG. 1, there is no direct contact between optical fiber 12 and flexible heat sink member 14 at gaps 26. Therefore, the heat generated in optical fiber 12 at gaps 26 propagates axially through optical fiber 12 to nearest segment 24, where the heat is removed from optical fiber 12. Due to the requirement for thermal conduction through optical fiber 12 (e.g., made from a fused silica material, a medium with a relatively poor thermal conduction), gaps 26 are maintained to be as small as possible. Gaps 26 are just large enough to provide the necessary mechanical compliance in the heat-sink assembly to accommodate the maximum temperature range required of fiber laser system 10. If necessary, system 10 shown in FIG. 1 may also include a spring (not shown) that slightly pushes segments 24 radially outward against optical fiber 12, thereby maintaining good thermal contact between optical fiber 12 and segments 24 despite some tolerance in the precise dimensions of optical fiber 12 and flexible heat sink member 14.

In this embodiment, as shown in FIG. 1, optical fiber 12 is coiled or wrapped around external surface 40 of segments 24 of flexible heat sink member 14.

Also, as shown in FIG. 1, thermal storage medium 18 is configured to fill at least a portion of volume 20 defined by at least heat sink member 14. While FIG. 1 illustrates that thermal storage medium 18 completely fills interior volume 20 of flexible heat sink member 14, the present disclosure contemplates that thermal storage medium 18 may only partially fill interior volume 20 of flexible heat sink member 14 (i.e., if remaining space of volume 20 is used for some other function).

In this embodiment, as shown in FIG. 1, fins 22 are configured to extend radially inward from the heat transfer surface area (of surface 36) of flexible heat sink member 14.

Heat pipe evaporator 16 is configured to dissipate the heat from thermal storage medium 18. Heat pipe evaporator 16 includes fins 28 that extend from surface 30 of heat pipe evaporator 16. Fins 28 are configured to provide heat transfer from thermal storage medium 18 to heat pipe evaporator 16. As shown in FIG. 1, heat pipe evaporator 16 is disposed at a center of system 10. Fins 28 extending from heat pipe evaporator 16 are configured to reduce the time required to solidify thermal storage medium 18. The density, placement and length of fins 28 on heat pipe evaporator 16 vary depending on the lasing time, the time required for solidification of thermal storage medium 18, and the energy storage requirement of thermal storage medium 18.

The heat from optical fiber 12 is transferred to flexible heat sink member 14. The heat from optical fiber 12 causes thermal expansion of flexible heat sink member 14. The segmented construction of heat sink member 14 (with gaps therebetween) provides high radial compliance to prevent distortion of heat sink member 14 (i.e., upon thermal expansion of flexible heat sink member 14) and to maintain thermal contact between heat sink member 14 and optical fiber 12. As noted above, the thermal contact between heat sink member 14 and optical fiber 12 is also achieved using thermal bond material 32. The heat from flexible heat sink member 14 is then transferred to heat pipe evaporator 16 via thermal storage medium 18. Thermal storage medium 18 melts and solidifies as it transfers the heat from flexible heat sink member 14 to heat pipe evaporator 16. Specifically, thermal storage medium 18 melts when it receives heat from flexible heat sink member 14 and solidifies as it transfers the heat to heat pipe evaporator 16. Fins 22 and 28 provide effective heat transfer from optical fiber 12 to heat pipe evaporator 16. Thus, heat pipe evaporator 16 dissipates the heat from optical fiber 12.

The second exemplary CTE-compensated configuration is shown in FIGS. 2 and 3. As noted above, flexible heat sink member 14 includes flexural cutouts 34 disposed on internal surface 36 of flexible heat sink member 14. Flexural cutouts 34 provide radial and torsional compliance for CTE accommodation over the operational temperature range of system 10. Also, the walls of flexible heat sink member 14 are kept thin so as to provide flexural compliance while maintaining strength for the expansion of thermal storage medium 18.

In one embodiment, flexible heat sink member 14 is machined to include flexural cutouts 34 so that flexible heat sink member 14 acts like a torsional spring or a stiff spring member to provide radial and torsional compliance for the CTE accommodation over the operational temperature range of system 10. In one embodiment, the flexible heat sink member with thin walls and the plurality of flexural cutouts as shown in FIGS. 2 and 3 has greater stiffness than the flexible heat sink member with the plurality of segments as shown in FIG. 1.

In an illustrated embodiment shown in FIGS. 2 and 3, flexural cutouts 34 are helical in shape. However, it is contemplated that flexural cutouts having other shapes may be provided on flexible heat sink member 14 to achieve the desired radial and torsional compliance. Flexural cutouts 34 are configured to allow compliance without slitting heat sink member 14 (i.e., outside cylinder surface) as was the case in the system shown in FIG. 1. The slitting of the outside cylinder surface may cause optical fiber 12 to traverse small slot gaps where no direct thermal contact is present.

Thermal bond material 32 thermally connects optical fiber 12 to flexible heat sink member 14. In this embodiment, as shown in FIGS. 2 and 3, optical fiber 12 is coiled or wrapped around external surface 40 of flexible heat sink member 14. Optical fiber 12 is wound around flexible heat sink member 14 with a predetermined amount of preload (tightness) to ensure contact (between optical fiber 12 and flexible heat sink member 14) over temperature excursions (i.e., the high and the low of temperature movement).

Also, as shown in FIGS. 2 and 3, thermal storage medium 18 is configured to fill at least a portion of volume 20 defined by at least heat sink member 14. While FIGS. 2 and 3 illustrate that thermal storage medium 18 completely fills interior volume 20 of flexible heat sink member 14, the present disclosure contemplates that thermal storage medium 18 may only partially fill interior volume 20 of flexible heat sink member 14 (i.e., if remaining space of volume 20 is used for some other function).

In this embodiment, as shown in FIGS. 2 and 3, fins 22 are configured to extend radially inward from the heat transfer surface area (of surface 36) of flexible heat sink member 14.

Heat pipe evaporator 16 includes fins 28 that extend from surface 30 of heat pipe evaporator 16. Fins 28 are configured to provide heat transfer from thermal storage medium 18 to heat pipe evaporator 16. As shown in FIGS. 2 and 3, heat pipe evaporator 16 is disposed at a center of system 10. Fins 28 extending from heat pipe evaporator 16 are configured to improve the time required to solidify thermal storage medium 18. The density, placement and length of fins 28 on heat pipe evaporator 16 vary depending on the lasing time, the time required for solidification of thermal storage medium 18, and the energy storage requirement of thermal storage medium 18.

The heat from optical fiber 12 is transferred to flexible heat sink member 14. The heat from optical fiber 12 causes thermal expansion of flexible heat sink member 14. The thin wall construction of heat sink member 14 along with the flexural cutouts provide high radial and torsional compliance to prevent distortion of heat sink member 14 (i.e., upon thermal expansion of flexible heat sink member 14) and to maintain thermal contact between heat sink member 14 and optical fiber 12. The heat from flexible heat sink member 14 is then transferred to heat pipe evaporator 16 via thermal storage medium 18. Thermal storage medium 18 melts and solidifies as it transfers the heat from flexible heat sink member 14 to heat pipe evaporator 16. Specifically, thermal storage medium 18 melts when it receives heat from flexible heat sink member 14 and solidifies as it transfers the heat to heat pipe evaporator 16. Fins 22 and 28 provide effective heat transfer from optical fiber 12 to heat pipe evaporator 16. Thus, heat pipe evaporator 16 dissipates the heat from optical fiber 12.

The third exemplary CTE-compensated configuration as shown in FIGS. 4 and 5. As noted above, this configuration provides an "inside-out" passive thermal management approach in which thermal storage medium 18 is disposed outside (rather than inside) flexible heat sink member 14. In other words, in this embodiment, system 10 includes outer casing 42. Thermal storage medium 18 is configured to fill at least a portion of volume 38 disposed between external surface 40 of flexible heat sink member 14 and outer casing 42.

In the third exemplary CTE-compensated configuration, flexible heat sink member 14 may include a plurality of segments that are separated from each other by a gap (as discussed in the first CTE-compensated configuration of FIG. 1). The gap is selected to provide radial or mechanical compliance (to accommodate the CTE mismatch between the material of optical fiber 12 and the material of flexible heat sink member 14) and to maintain direct thermal contact between optical fiber 12 and flexible heat sink member 14.

Alternatively or additionally, in the third exemplary CTE-compensated configuration, flexible heat sink member 14 may include a plurality of flexural cutouts disposed on an external surface thereof (as discussed in the second CTE-compensated configuration of FIGS. 2 and 3). These flexural cutouts provide radial and torsional compliance for CTE accommodation over the operational temperature range of system 10. In one embodiment, the flexural cutouts are helical in shape. Also, the thickness of the walls of flexible heat sink member 14 are thin so as to provide flexural compliance while maintaining strength for PCM expansion.

Thermal bond material 32 thermally connects optical fiber 12 to flexible heat sink member 14. In this embodiment, as shown in FIGS. 4 and 5, optical fiber 12 is coiled or wrapped around internal surface 36 of flexible heat sink member 14.

Also, as shown in FIGS. 4 and 5, thermal storage medium 18 is configured to fill at least a portion of volume 38 disposed between external surface 40 of heat sink member 12 and outer casing 42. While FIGS. 4 and 5 illustrate that thermal storage medium 18 completely fills volume 38 disposed between external surface 40 of heat sink member 12 and outer casing 42, the present disclosure contemplates that thermal storage medium 18 may only partially fill volume 38 (i.e., if remaining space of volume 38 is used for some other function).

In this embodiment, as shown in FIGS. 4 and 5, fins 22 of flexible heat sink member 14 are configured to extend radially outward from the heat transfer surface area (of surface 40) of flexible heat sink member 14.

In this embodiment, as shown in FIGS. 4 and 5, the heat is conducted from optical fiber 12 into thermal storage medium 18 via flexible heat sink member 14. Optical fiber 12 is in thermal contact with flexible heat sink member 14. The heat from optical fiber 12 causes thermal expansion of flexible heat sink member 14. The thin wall construction of heat sink member 14 along with the flexural cutouts and/or the segmented construction of the heat sink member along with the gaps provide high radial and torsional compliance to prevent distortion of heat sink member 14 (i.e., upon thermal expansion of flexible heat sink member 14) and to maintain thermal contact between heat sink member 14 and optical fiber 12. Fins 22 are configured to ensure effective thermal conduction (i.e., promote thermal transport) from flexible heat sink member 14 to encasing thermal storage medium 18. Thermal storage medium 18 melts and solidifies as it transfers the heat from flexible heat sink member 14 to heat pipe evaporator 16. In other words, thermal storage medium 18 melts when it receives heat from flexible heat sink member 14, and solidifies as it transfers the heat to heat pipe evaporator 16. System 10 shown in FIGS. 4 and 5 includes annular heat pipe evaporator 16 that is encased with thermal storage medium 18. Thus, heat pipe evaporator 16 dissipates the heat from optical fiber 12.

A thermal analysis was performed on the passive thermal management cooling system shown in FIG. 1 of the present disclosure. As shown in FIG. 1, passive thermal management cooling system 10 includes optical fiber 12, thermal bond material 32, flexible heat sink member 14, thermal storage medium 18, and heat pipe evaporator 16. The thermal analysis was performed under the assumption that the system includes a 1 kW fiber laser having an optical-to-optical efficiency of 50% and operating at a 10% duty cycle in a 100 minute orbit. Based on the thermal analysis, it was determined that this 1 kW fiber laser requires approximately 60 in³ of the thermal storage medium made of, for example, Lithium Nitrate Trihydrate (i.e., salt hydrate). Under the assumed conditions, the fiber core temperature increased to approximately 70° C., since this thermal storage medium has melt temperature of 30° C. Also, under the assumed conditions, system 10 illustrated in FIG. 1 may be packaged in a 4 inch diameter flexible heat sink member having a length of approximately 5 inches.

Figure 6:
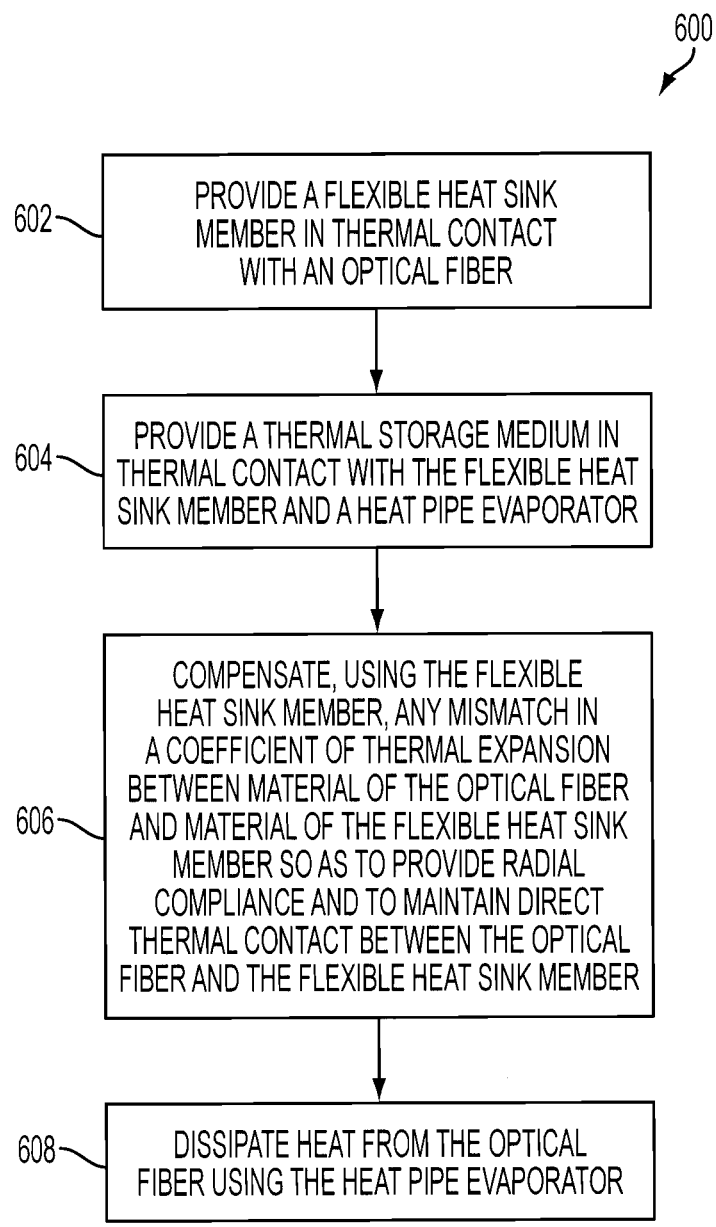
FIG. 6 is a flow chart illustrating a method for cooling the optical fiber in accordance with an embodiment of the present disclosure.

Method 600 for cooling optical fibers is shown and described in FIG. 6. At procedure 602, flexible heat sink member 14 is provided to be in thermal contact with optical fiber 12. As noted above, the thermal contact between flexible heat sink member 14 and optical fiber 12 is achieved by using thermal bond material 32 in cooperation with the flexible construction (explained in detail with respect to FIGS. 1-5) of heat sink member 14. At procedure 604, thermal storage medium 18 is made to be in thermal contact with flexible heat sink member 14 and heat pipe evaporator 16. At procedure 606, any mismatch in coefficient of thermal expansion between material of optical fiber 12 and material of the heat sink member 14 is compensated using flexible heat sink member 14 so as to provide radial compliance and to maintain direct thermal contact between optical fiber 12 and flexible heat sink member 14. At procedure 608, the heat from optical fiber 12 is dissipated using heat pipe evaporator 16.

The method and system of the present disclosure provides a robust fiber-laser cooling system and method that is used in, for example, space-based applications where cooling the fiber using a flowing liquid is not a viable option. Also, the passive thermal management approach described in the present disclosure is desirable for space applications because the system does not actively pump a working fluid. In other words, the system does not use a pump and therefore the system does not include any moving parts that are associated with such a pump.

The method and system of the present disclosure provides a passive fiber laser cooling strategy that may be used in space-based applications, for example, satellites that are used for Astronomy satellites, Atmospheric Studies satellites, Communications satellites, Navigation satellites, Reconnaissance satellites, Remote Sensing satellites, and Search and Rescue satellites.

The method and system of the present disclosure provides a passive fiber laser cooling strategy that may be used in any application that has low duty cycle or a continuous duty cycle.

The method and system of the present disclosure provides cooling for fiber lasers that are operating for short time periods of a few seconds to perhaps ten minutes. The static thermal management approach utilizing a PCM disclosed in the present disclosure is well suited for high power laser applications having high heat fluxes for short durations. The passive thermal management approach described in the present disclosure is particularly applicable to the packaging of a high power fiber laser, since the PCM can be packaged relatively close to the heat source (i.e. the optical fiber).

The method and system of the present disclosure provides a passive thermal management approach in which the optical fiber (fiber laser or amplifier) is in good thermal contact with the heat sink member. The heat sink member conducts the heat away from the fiber laser to the heat exchanger or the heat pipe evaporator, or, in space applications, a radiator. For applications where the fiber laser is not operated at a 100% temporal duty cycle, in order to minimize the size, weight, and complexity of the thermal management system, the thermal energy is stored in a phase change material (PCM), and then the stored energy is removed at a lower rate than it was generated by the fiber laser, with a lower-power dissipation system.

Although the present disclosure has been described in detail for the purpose of illustration, it is to be understood that such detail is solely for that purpose and that the inventive concept is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment may be combined with one or more features of any other embodiment.

What is claimed is:

1. A system for cooling an optical fiber, the system comprising:
    a flexible heat sink member in thermal contact with the optical fiber;
    a heat pipe evaporator configured to dissipate heat from the optical fiber; and
    a thermal storage medium in thermal contact with the flexible heat sink member and the heat pipe evaporator,
    wherein the flexible heat sink member is constructed and arranged to compensate for any mismatch in coefficient of thermal expansion between material of the optical fiber and material of the flexible heat sink member so as to provide flexibility in a radial direction and to maintain direct thermal contact between the optical fiber and the flexible heat sink member when the optical fiber is coiled around the flexible heat sink member.

2. The system of claim 1, wherein the flexible heat sink member has an oval shaped cross-sectional configuration.

3. The system of claim 1, wherein the flexible heat sink member has a cylindrical circular shaped cross-sectional configuration.

4. The system of claim 1, wherein the heat sink member comprises a metal material.

5. The system of claim 1, wherein the heat sink member comprises a metal matrix composite material.

6. The system of claim 1, wherein the direct thermal contact between the heat sink member and the optical fiber is achieved using a thermal bond material in cooperation with the flexible heat sink member.

7. The system of claim 6, wherein thermal conductivity of the thermal bond material is improved by dispersing a silver material into the thermal bond material.

8. The system of claim 1, wherein the flexible heat sink member comprises a plurality of fins that extend from the flexible heat sink member and which are configured to increase heat transfer between a surface area of the flexible heat sink member and the thermal storage medium.

9. The system of claim 8, wherein the plurality of fins are configured to extend radially from the heat transfer surface area of the flexible heat sink member.

10. The system of claim 9, wherein the plurality of fins are configured to extend radially inward from the heat transfer surface area of the flexible heat sink member.

11. The system of claim 9, wherein the plurality of fins are configured to extend radially outward from the heat transfer surface area of the flexible heat sink member.

12. The system of claim 8, wherein outer surface of the flexible heat sink member comprises a plurality of segments that are separated from each other by a gap, wherein the width of the segment in contact with one turn of the coiled optical fiber is selected to maintain direct thermal contact between the optical fiber and the flexible heat sink member over a desired range of operating temperatures in the optical fiber, and the gap provides the heat sink member with radial compliance.

13. The system of claim 8, wherein the flexible heat sink member comprises a plurality of flexural cutouts disposed on an internal surface thereof.

14. The system of claim 8, wherein the thermal storage medium is configured to fill at least a portion of a volume defined by at least the flexible heat sink member.

15. The system of claim 9, further comprising an outer casing, wherein the thermal storage medium is configured to fill at least a portion of a volume disposed between the flexible heat sink member and the outer casing.

16. The system of claim 1, wherein the heat pipe evaporator comprises a plurality of fins that extend from a surface of the heat pipe evaporator, the plurality of fins are configured to provide heat transfer from the thermal storage medium to the heat pipe evaporator.

17. The system of claim 1, wherein the thermal storage medium comprises a paraffin medium.

18. The system of claim 1, wherein the thermal storage medium comprises a salt hydrate medium.

19. The system of claim 1, wherein the thermal storage medium is selected from the group consisting of lithium nitrate trihydrate, sodium thiosulfate, cerrolo fusible alloy-158, acetamide, n-hexatriac ontane, n-triac ontane, eicosane, and thermasorb 95.

20. The system of claim 1, wherein the optical fiber comprises a fiber amplifier.

21. The system of claim 1, wherein the optical fiber comprises a fiber laser.

22. A method for cooling an optical fiber, the method comprising:
providing a flexible heat sink member in thermal contact with the optical fiber;
providing a thermal storage medium in thermal contact with the heat sink member and a heat pipe evaporator;
compensating, using the flexible heat sink member, for any mismatch in a coefficient of thermal expansion between the optical fiber and the heat sink member so as to provide flexibility in a radial direction and to maintain direct thermal contact between the optical fiber and the flexible heat sink member when the optical fiber is coiled around the flexible heat sink member; and
dissipating heat from the optical fiber using the heat pipe evaporator.

23. The method of claim 22, wherein the optical fiber comprises a fiber amplifier.

24. The method of claim 22, wherein the optical fiber comprises a fiber laser.

* * * * *